United States Patent
Perotto et al.

(10) Patent No.: US 6,206,418 B1
(45) Date of Patent: Mar. 27, 2001

(54) HYBRID GENERATOR WITH INTERNAL GAS INJECTION

(75) Inventors: Christian Perotto, Ballancourt; Christian Perut, Saint Fargeau Ponthierry; Eric Billou, Camblanes et Meynac, all of (FR)

(73) Assignee: S.N.C. Livbag, Vert le Petit (FR)

( * ) Notice: Subject to any disclaimer, the term of this patent is extended or adjusted under 35 U.S.C. 154(b) by 0 days.

(21) Appl. No.: 09/230,805

(22) PCT Filed: Jul. 10, 1997

(86) PCT No.: PCT/FR97/01260
§ 371 Date: Feb. 9, 1999
§ 102(e) Date: Feb. 9, 1999

(87) PCT Pub. No.: WO98/06998
PCT Pub. Date: Feb. 19, 1998

(30) Foreign Application Priority Data
Aug. 9, 1996 (FR) .................................. 96 10045

(51) Int. Cl.[7] .................................................. B60R 21/26
(52) U.S. Cl. ...................... 280/736; 280/737; 280/741; 280/742; 102/530; 102/531
(58) Field of Search ................................... 280/737, 736, 280/741, 742; 102/530, 531

(56) References Cited

U.S. PATENT DOCUMENTS

| | | |
|---|---|---|
| 3,723,205 | 3/1973 | Scheffee . |
| 3,813,007 | 5/1974 | Doin et al. . |
| 3,985,375 | 10/1976 | Lewis et al. . |
| 5,199,740 | 4/1993 | Frantom et al. . |
| 5,460,406 * | 10/1995 | Faigle .................................. 280/741 |
| 5,468,015 * | 11/1995 | Goetz .................................. 280/737 |
| 5,536,040 | 7/1996 | Cuevas et al. . |
| 5,586,783 * | 12/1996 | Adam et al. .......................... 280/737 |
| 5,615,912 * | 4/1997 | O'Loughlin et al. ................. 280/737 |
| 5,664,803 * | 9/1997 | Skanberg et al. ..................... 280/737 |
| 5,700,030 * | 12/1997 | Goetz ................................... 280/736 |
| 5,743,557 * | 4/1998 | Butt ...................................... 280/737 |
| 5,803,494 * | 9/1998 | Headley ............................... 280/741 |
| 5,806,884 * | 9/1998 | Johnson et al. ...................... 280/736 |
| 5,813,694 * | 9/1998 | Jeong ................................... 280/737 |
| 5,851,030 * | 12/1998 | Johnson et al. ...................... 280/741 |
| 5,863,066 * | 1/1999 | Blumenthal .......................... 280/737 |
| 5,882,036 * | 3/1999 | Moore et al. ......................... 280/736 |
| 5,884,938 * | 3/1999 | Rink et al. ............................ 280/741 |
| 5,890,735 * | 4/1999 | Smith ................................... 280/737 |
| 5,931,495 * | 8/1999 | Rink et al. ............................ 280/737 |
| 6,010,153 * | 1/2000 | Halas et al. .......................... 280/737 |
| 6,012,737 * | 1/2000 | Van Wynsberghe et al. ....... 280/737 |

FOREIGN PATENT DOCUMENTS

| | | |
|---|---|---|
| 685 369 | 12/1995 | (EP) . |
| 2 294 999 | 5/1996 | (GB) . |
| 95/18730 | 7/1995 | (WO) . |

* cited by examiner

*Primary Examiner*—Lanna Mai
*Assistant Examiner*—Toan C To
(74) *Attorney, Agent, or Firm*—Pillsbury Winthrop LLP

(57) ABSTRACT

The invention relates to the field of hybrid generators for motor vehicle safety. The generator (101) comprises a cylindrical housing (2) closed by a closure ring (5) bearing an ignition device (8). An internal wall (12) bearing a central opening (14) and a hollow neck (16) in which is inserted a ring-shaped block (19) of solid ablatable fuel separates a reservoir chamber (17) containing pressurized air from a combustion and mixing chamber (18). Discharge holes (21) closed by breakable diaphragms (22) are arranged on the circumference of the combustion chamber (18). This generator has a very simple design and enables the inflating of cushions for protecting the occupants of motor vehicles.

5 Claims, 2 Drawing Sheets

HYBRID GENERATOR WITH INTERNAL GAS INJECTION

This application is the national phase of international application PCT/FR97/01260 filed Jul. 10, 1997 which designated the U.S.

BACKGROUND OF THE INVENTION

The present invention relates to the field of motor vehicle safety. More specifically, the invention relates to a hybrid gas-generator containing a solid pyrotechnic charge and a reserve of pressurized gas and intended to inflate a cushion for protecting the occupants of a motor vehicle.

Hybrid generators which rely on the principle of producing active gases by mixing gases that result from the combustion of a solid or liquid fuel with distinct cold gases are highly sought-after in motor vehicle safety because they produce gases which are not as hot and which can meet the low-toxicity standards required in motor vehicle safety more readily than can the gases supplied by traditional solid-charge generators.

Various types of hybrid generator have been proposed to those skilled in the art. Patent U.S. Pat. No. 3,813,007 or its counterparts FR-A-2,116,947 and FR-A-2,116,949 have proposed a type of hybrid generator comprising a double base solid powder charge, the combustion gases of which are diluted with a vaporizable liquid contained in a reservoir equipped with a piston that can move under the action of the pressure in the generator.

The relatively complicated structure of this generator and the use of a liquid mean that the person skilled in the art has not adopted this solution.

Patent U.S. Pat. No. 5,199,740 has proposed a gas generator in which the gases from the combustion of a solid pyrotechnic charge are diluted in a space full of pressurized inert gas. Such a generator is also of a very complicated structure.

Application EP-A-0,685,369 has proposed a hybrid generator in which an oxidizing gas mixture under pressure is heated by combustion with a liquid fuel before being diluted in a space containing pressurized inert gas. Such a generator, which requires a number of pressurized chambers, exhibits the same type of drawbacks.

SUMMARY OF THE INVENTION

There has therefore been proposed, in application GB-A-2,294,999, a hybrid generator which has a reserve of pressurized oxidizing gas which, in operation, is heated by combustion with magnesium and iron. This generator has a twofold drawback: it requires an effective filtering system to prevent hot metal particles from entering the cushion and, on the other hand, as the said combustion takes place at the exit from the generator, this generator discharges gases which are still relatively hot into the inflatable cushion.

Finally, there has also been proposed, for example in application PCT WO 95/18730, a hybrid generator comprising a solid pyrotechnic charge the combustion gases of which are diluted with ambient air taken through a system of induction horns. This system, which in theory might seem highly attractive, is not, in practice, satisfactory because, given the very short operating times demanded in motor vehicle safety, it is unable to draw in a large amount of ambient air and the gases which inflate the cushion are, for the most part, the hot gases that result from the combustion of the pyrotechnic charge.

Thus, the person skilled in the art does not currently have available to him an inexpensive hybrid generator of a simple structure which operates satisfactorily.

The object of the present invention is specifically to propose such a generator.

DETAILED DESCRIPTION OF THE INVENTION

Figure 1:
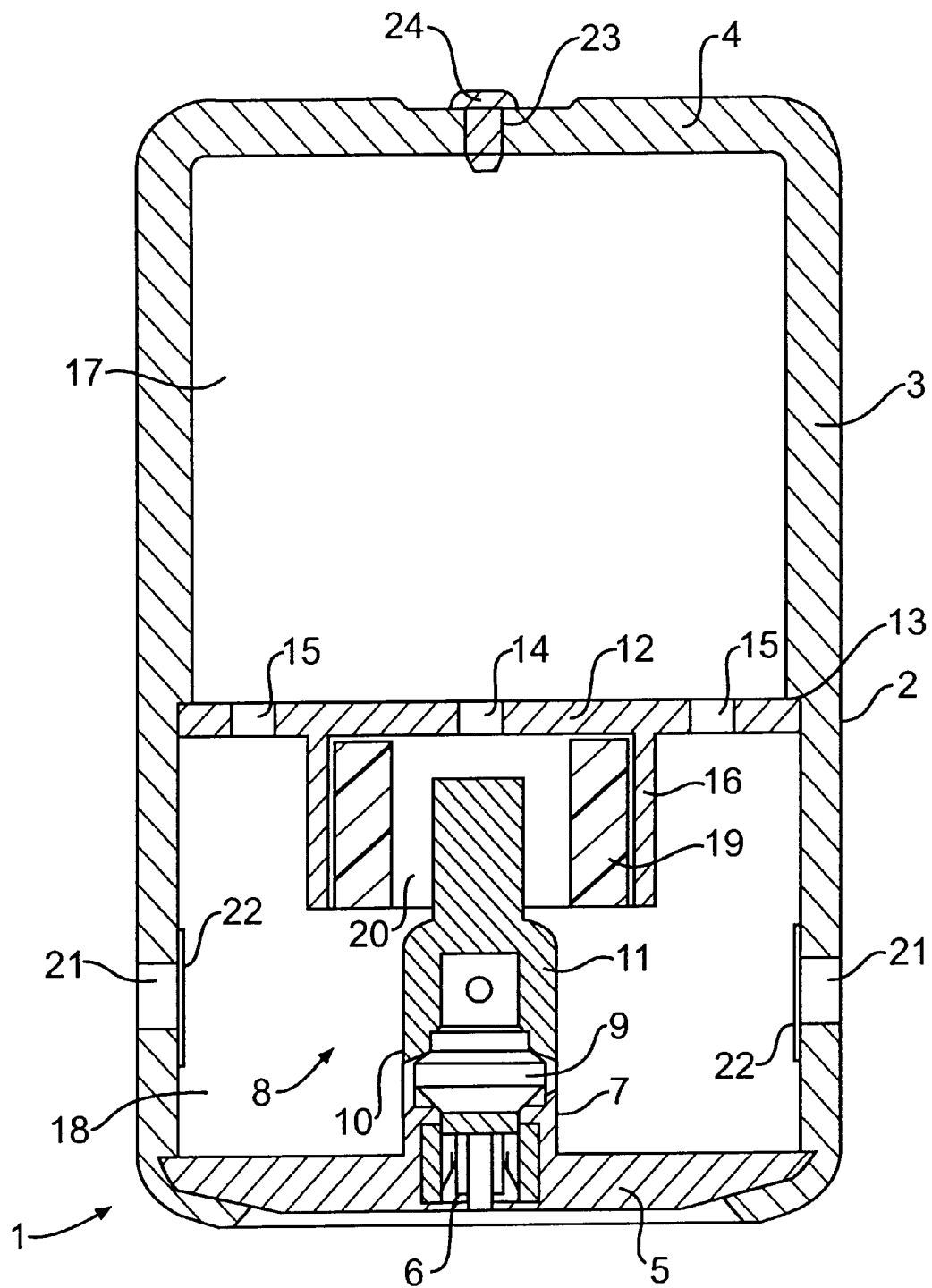
FIG. 1 provides a view in section of a first generator according to the invention.

The invention therefore relates to a hybrid gas-generator intended in particular for inflating a pro-tective cushion, comprising a gastight space containing a reservoir chamber filled with a pressurized gas and a combustion and mixing chamber in which an ignition device and a solid pyrotechnic charge are arranged, the said space having, in the region of the said combustion and mixing chamber, at least one discharge hole closed by a breakable diaphragm, the said reservoir chamber and the said combustion and mixing chamber being separated from each other by a wall inside the said space, the said generator being characterized in that:

the said wall has at least one opening allowing the gas contained in the said reservoir chamber to be discharged in a time that is approximately equal to the burn time of the pyrotechnic charge, once the diaphragm that closes the discharge hole has been broken, the said pyrotechnic charge is a fully consumable gas-generating charge.

In the event of a collision, an electrical signal will detonate the ignition device which will start off combustion of the pyrotechnic charge. The resulting increase in pressure inside the combustion and mixing chamber will cause the breakable diaphragm which closes the discharge hole to rupture. From this moment on, the pressurized gas contained in the reservoir chamber will flow out, through the openings borne by the internal wall, into the combustion and mixing chamber to mix with the hot gases produced by the combustion of the pyrotechnic charge. The mixture thus formed leaves the hybrid generator through the discharge hole.

The openings borne by the internal wall need to be calibrated to allow the reservoir chamber to empty in a time that is approximately equal to the burn time of the pyrotechnic charge. These openings may, in the initial state, be uncovered, and in this case the pressure inside the reservoir chamber will be equal to the pressure in the combustion and mixing chamber, or they may be closed by breakable diaphragms.

The fully consumable pyrotechnic charge needs to burn without producing solid residues if it is desired that the hybrid generator according to the invention should have no filtration device. This pyrotechnic charge may consist of a solid propellant which is balanced in terms of oxidizing agent and reducing agent, in which case the pressurized gases contained in the reservoir chamber will serve merely as diluent and will advantageously consist of inert gases such as nitrogen, argon or helium.

However, according to a preferred embodiment of the invention, the said pyrotechnic charge is a charge which produces reducing gases by combustion, the pressurized gas in the reservoir chamber in this case being an oxidizing agent which will burn with the said reducing gases.

Pressurized air or argon/oxygen mixtures will advantageously be used as oxidizing gas.

One family of fully consumable pyrotechnic charges which produce reducing gases consists, for example, of the compositions containing a polyurethane binder based on hydroxytelechelic polybutadiene with octogen as the oxidizing agent.

According to a particularly preferred embodiment of the invention, the solid pyrotechnic charge will be an ablatable organic charge. A pyrotechnic charge is said to be "ablatable" when it can burn only with an external supply of oxidizing agent. This ablatable organic pyrotechnic charge will mainly consist of a material chosen from the group made up of 5-aminotetrazole, diaminotriazole, trihydrazinotriazine, poly(glycidyl azide) polyurethanes, hydroxytelechelic polybutadiene polyurethanes and polycarbonates.

According to a second preferred embodiment of the invention, the said space consists of a cylindrical housing comprising a side wall and an end wall, the said housing being closed by a closure ring crimped into the free end of the said housing. The closure ring has a central circular hole extended by a hollow cylindrical neck in which the said ignition device is inserted. In this embodiment, the said internal wall consists of a disc which has a hollow cylindrical axial neck directed towards the said ignition device. The internal wall thus defines, with the closure ring, the limits of the mixing and combustion chamber, the reservoir chamber being located between the internal wall and the end wall of the cylindrical housing.

The pyrotechnic charge is inserted and possibly bonded into the hollow neck borne by the said internal wall. Advantageously, this pyrotechnic charge is a ring-shaped charge with a central passage and the internal wall has at least one central opening opening into the passage in the pyrotechnic charge.

When the ring-shaped charge is an ablatable charge, the internal wall will preferably have just this central opening so as to guarantee that all the gas contained in the reservoir chamber does indeed pass over the ablatable charge. When the ablatable charge has a number of passages, the internal wall will have one opening facing each passage.

Hybrid generators according to the invention exhibit the following series of advantages:

they supply gases which are free of any solid particles and which are non-toxic,
  they are made up of a small number of very simple parts and therefore inexpensive,
  by choosing the solid charge and the pressurized gas, they give access to a very wide range of temperatures at the exit from the generator.

Furthermore, when an ablatable solid charge is used, these generators have just one sensitive pyrotechnic element, namely the ignition device.

Generators according to the invention are well suited to inflating cushions for protecting drivers or passengers of motor vehicles.

A preferred embodiment of the invention is now described in detail with reference to FIGS. 1 and 2.

FIG. 1 depicts a view in section of a first generator according to the invention.

Figure 2:
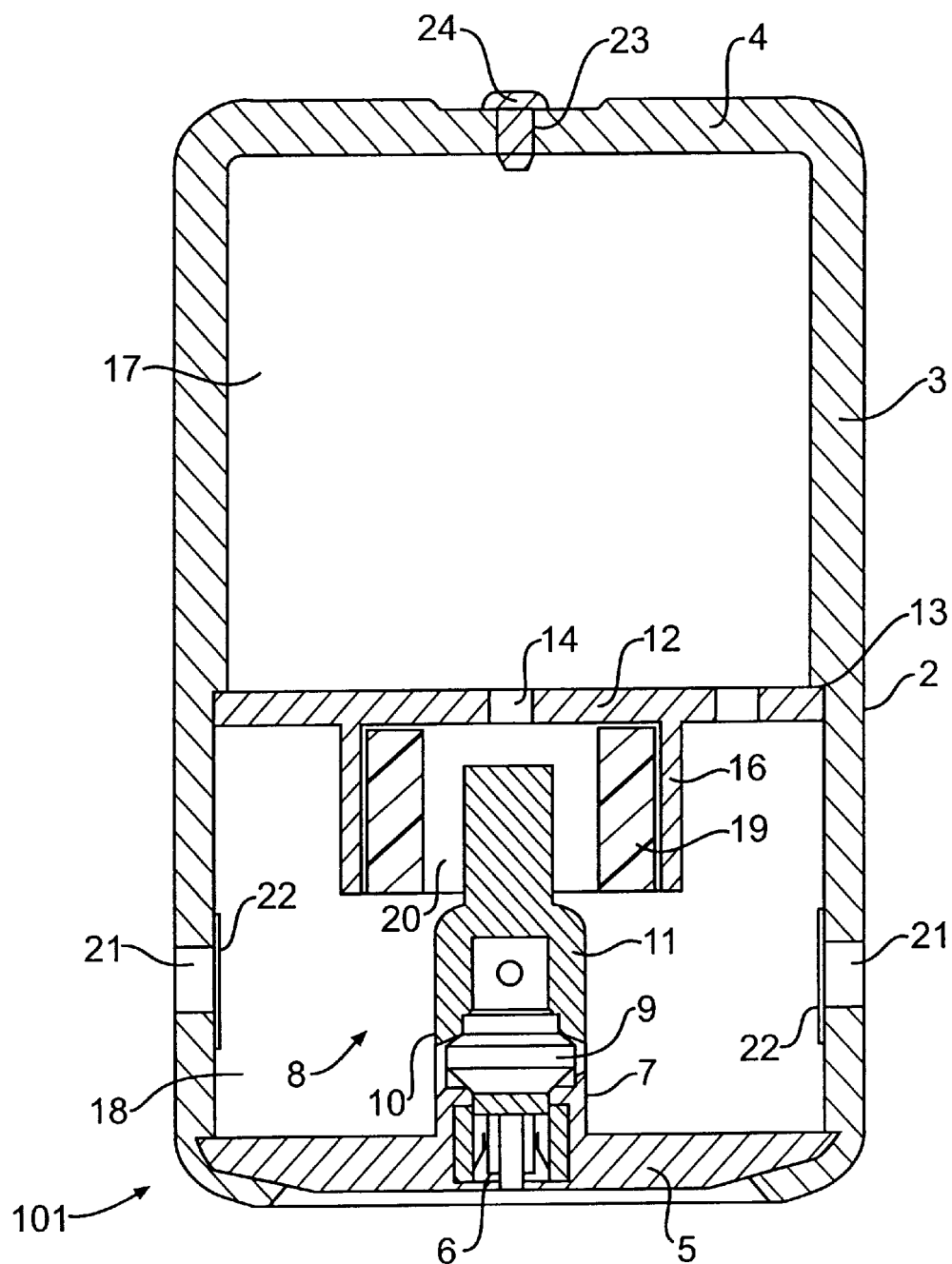
FIG. 2 provides a view in section of a second generator according to the invention.

FIG. 2 depicts a view in section of a second generator according to the invention.

The generator 1 depicted in FIG. 1 consists of a cylindrical housing 2 comprising a side wall 3 and an end wall 4 which form just one and the same piece. The housing 2 is closed by a closure ring 5 crimped into the free end of the said housing. The housing 2 and the ring 5 constitute a gastight space. This space must withstand high pressures, in excess of 30 MPa or even 60 MPa, and its constituent parts will be made of steel. The said closure ring 5 has a central hole 6 bordered by a hollow cylindrical neck 7 inside the generator 1 and in which an ignition device 8 consisting of an electrical igniter 9 surrounded by a frangible metal cap 10 completely full of ignition powder 11 is inserted. A disc-shaped internal wall 12 divides the inside of the generator 1 into two distinct internal chambers. This internal wall 12 rests on an internal shoulder 13 exhibited by the internal lateral surface of the housing 2 and welded thereto, for example by electron bombardment. The wall 12 is a support piece which has to withstand high pressures and high temperatures which may be as much as or in excess of 2000 K.

The wall 12 has a central opening 14 and peripheral openings 15, these openings not being closed by diaphragms. The wall 12 also supports a hollow cylindrical axial neck 16 directed towards the ignition device. This neck must also withstand high temperatures and high pressures; advantageously, as depicted in FIG. 1, it will form just one and the same metal piece with the wall 12.

The wall 12 thus divides the inside of the generator 1 into two distinct chambers, a reservoir chamber 17 bounded by the end wall 4 and by the wall 12 and a combustion and mixing chamber 18 bounded by the wall 12 and by the closure ring 5. A block 19 of completely consumable pyrotechnic charge is inserted in the neck 16 borne by the internal wall 12.

This block of charge 19 is a ring-shaped block with a central passage 20 located facing the central opening 14 exhibited by the internal wall 12.

To form this charge 19, use may advantageously be made of a composition that satisfies the following formulation:

| | |
|---|---|
| octogen | 86 parts by weight |
| hydroxytelechelic polybutadiene isophorone diisocyanate dioctyl azelate dibutyltin dilaurate | 14 parts by weight |

Made in the side wall of the combustion and mixing chamber 18 are discharge holes 21 arranged relatively close to the closure ring 5 and therefore relatively far away from the block 19 of consumable charge. These discharge holes 21 are closed by diaphragms 22 calibrated to break at a predetermined pressure.

The reservoir chamber 17 is filled with a pressurized gas, for example air at 30 MPa. It should be observed that since the openings 14 and 15 borne by the internal wall 12 are open, it is the entire interior volume of the generator 1 which is at this pressure. To allow the generator 1 to be filled with pressurized gas, the end wall 4 has an axial hole 23 which is closed, after filling, with a plug of welding 24.

The way in which this generator works is as follows. In the event of a collision, an electrical signal initiates the igniter 9 which sets fire to the ignition powder 11. The gases from the combustion of the latter cause the cap 10 to shatter and ignite the pyrotechnic charge 19. The resulting increase in pressure in the chamber 18 causes the diaphragms 22 to burst and the gases begin to leave via the discharge holes 21. The gases contained in the reservoir chamber 17 therefore leave this chamber through the holes 14 and 15 reacting, as appropriate, with the gases from the combustion of the charge 19 and diluting them.

FIG. 2 depicts a generator 101 similar to the generator 1, the identical elements bearing in FIG. 2 the same references as they did in FIG. 1. In the generator 101, the wall 12 has just one central opening 14, thus making sure that all of the gases contained in the reservoir chamber 17 pass over the block of charge 19. This embodiment is recommended when the charge 19 is an ablatable charge. It can also be seen that in the case of the generator 101, the block of charge 19 is coated with an external layer 25 of inhibitor which allows the charge 19 to be bonded into the neck 16 borne by the internal wall 12.

What is claimed is:

1. Hybrid gas-generator intended in particular for inflating a protective cushion, comprising a gastight space containing a reservoir chamber filled with a pressurized gas and a combustion and mixing chamber in which an ignition device and a solid pyrotechnic charge are arranged, said charge having a burn time, which is from the time of ignition until the time of complete consumption of said charge and being completely consumable upon being ignited, and said space having, in the region of said combustion and mixing chamber, at least one discharge hole closed by a breakable diaphragm, said reservoir chamber and said combustion and mixing chamber being separated from each other by a wall, said wall having a cylindrical neck and being inside said space, said wall having at least one opening allowing the gas contained in said reservoir chamber to be discharged in a time that is approximately equal to said burn time of the pyrotechnic charge, said pyrotechnic charge being within said cylindrical neck, said gas-generator being characterized in that:

i) said space being defined by a cylindrical housing, said cylindrical housing comprising a side wall attached at one end to an end wall and terminating at a free end located opposite to said attachment at said one end wall, said cylindrical housing forming just one and the same piece being closed by a closure ring crimped into said free end of said housing;

ii) said closure ring having a central circular hole extended by a hollow cylindrical neck in which said ignition device is inserted; and iii) said pyrotechnic charge burns without producing solid residues and is in the form of a block.

2. Hybrid generator according to claim 1, characterized in that said pressurized gas is an oxidizing gas and in that said pyrotechnic charge (19) produces reducing gases by combustion.

3. Hybrid generator according to claim 2, characterized in that said pyrotechnic charge (19) is an ablatable organic charge.

4. Hybrid generator according to claim 3, characterized in that said ablatable organic pyrotechnic charge mainly comprises a material selected from the group consisting of 5-aminotetrazole, diaminotriazole, trihydrazinotriazine, poly(glycidyl azide) polyurethanes, hydroxytelechelic polybutadiene ployurethanes and polycarbonates.

5. Hybrid generator according to claim 1, characterized in that said pyrotechnic charge (19) is a ring-shaped charge with a central passage (20) and in that said wall has at least one central opening (14).

* * * * *